United States Patent
Glemser et al.

(10) Patent No.: US 11,566,669 B2
(45) Date of Patent: Jan. 31, 2023

(54) COMPONENT ASSEMBLY FOR A MOTOR VEHICLE

(71) Applicant: Robert Bosch GmbH, Stuttgart (DE)

(72) Inventors: Ralph Glemser, Brackenheim (DE); Rene Schepp, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 17/148,987

(22) Filed: Jan. 14, 2021

(65) Prior Publication Data
US 2021/0222736 A1 Jul. 22, 2021

(30) Foreign Application Priority Data
Jan. 17, 2020 (DE) ..................... 10 2020 200 555.9

(51) Int. Cl.
*F16C 33/78* (2006.01)
*F16J 15/3228* (2016.01)
(Continued)

(52) U.S. Cl.
CPC ........... *F16C 33/78* (2013.01); *F16J 15/3228* (2013.01); *F16K 41/04* (2013.01); *F16K 41/08* (2013.01); *F16J 15/002* (2013.01); *F16J 15/3268* (2013.01)

(58) Field of Classification Search
CPC ........ F16K 41/04; F16K 41/043; F16K 41/08; F16K 41/083; F16J 15/002; F16J 15/3228;
(Continued)

(56) References Cited

U.S. PATENT DOCUMENTS 3,096,096 A * 7/1963 Banks ..................... F16K 41/08
277/540
3,104,861 A * 9/1963 Heyer et al. ............ F16K 21/06
188/286

(Continued)

FOREIGN PATENT DOCUMENTS

| CN | 2331814 Y | 8/1999 |
|---|---|---|
| DE | 27 56 403 A1 | 6/1978 |
| DE | 10 2018 103 720 A1 | 8/2018 |

*Primary Examiner* — Nicholas L Foster
(74) *Attorney, Agent, or Firm* — Maginot, Moore & Beck LLP

(57) ABSTRACT

A component assembly for a motor vehicle includes a housing and an actuating element that is rotatable about an axis. The assembly also includes an actuator which is configured to cause a rotation of the actuating element. The assembly further includes a rotatable shaft which extends along a shaft axis and is disposed between the actuating element and the actuator and which is coupled to the actuating element and the actuator. The shaft is guided through a first through opening in the housing. A sealing system is provided in a radial direction perpendicular to the shaft axis so as to be between the shaft and a first internal wall of the first through opening. The sealing system has a sealing element support having a first side and a second side that faces away from the first side. The sealing element support is fastened in the first through opening. The sealing element support has a second through opening having a second internal wall. The shaft is guided through the second through opening. A first sealing element is fastened in a locationally fixed manner to the sealing element support on the first side of the sealing element support. The first sealing element has a third through opening through which the shaft is guided. The first sealing element by way of a third internal wall of the third through opening bears in an encircling (Continued)

manner on the shaft. And the first sealing element is designed from felt.

20 Claims, 3 Drawing Sheets

(51) Int. Cl.
    *F16K 41/04*         (2006.01)
    *F16J 15/3268*     (2016.01)
    *F16J 15/00*        (2006.01)
    *F16K 41/08*        (2006.01)

(58) Field of Classification Search
    CPC .... F16J 15/3268; F16J 15/3284; F16C 33/78;
                 F16C 33/7816; F16C 33/7886
    See application file for complete search history.

(56) References Cited

U.S. PATENT DOCUMENTS

| | | | |
|---|---|---|---|
| 3,384,382 A * | 5/1968 | Rink | F16J 15/46 277/346 |
| 3,804,476 A * | 4/1974 | Nakamura | F16C 33/6648 384/469 |
| 3,850,189 A * | 11/1974 | Follett | F16K 17/36 137/460 |
| 5,005,602 A * | 4/1991 | Fahl | F16K 1/12 251/98 |
| 5,127,428 A * | 7/1992 | Fahl | F16K 1/12 137/219 |
| 6,866,244 B2 * | 3/2005 | Wears | F16K 41/04 251/318 |
| 7,429,028 B2 * | 9/2008 | Tanaka | F02M 26/67 277/309 |
| 8,113,485 B2 * | 2/2012 | Chang | F16L 29/002 251/99 |
| 8,132,785 B2 * | 3/2012 | Sugita | F16K 41/046 277/516 |
| 8,579,256 B2 * | 11/2013 | Wetzel | F16K 41/046 251/315.1 |
| 9,976,653 B2 * | 5/2018 | Suzuki | F16J 15/006 |
| 10,041,401 B2 * | 8/2018 | Lenk | F02M 35/10157 |
| 10,371,264 B2 * | 8/2019 | Hasegawa | F02M 26/67 |
| 10,605,145 B2 * | 3/2020 | Greber | F16K 49/005 |
| 11,131,403 B2 * | 9/2021 | Bobo | F16K 31/607 |
| 2004/0007684 A1 * | 1/2004 | Dube | F16K 41/043 251/214 |
| 2004/0155217 A1 * | 8/2004 | Wears | F16K 41/04 251/214 |
| 2005/0082507 A1 * | 4/2005 | Tanaka | F16J 15/3228 251/318 |
| 2009/0289423 A1 * | 11/2009 | Sugita | F16J 15/20 277/511 |
| 2011/0012044 A1 * | 1/2011 | Wetzel | F16K 5/0657 251/315.1 |
| 2015/0345639 A1 * | 12/2015 | Suzuki | F16J 15/3232 277/563 |
| 2017/0284285 A1 * | 10/2017 | Lenk | F02B 37/16 |
| 2017/0298812 A1 * | 10/2017 | Lenk | F16K 31/0655 |
| 2019/0120111 A1 * | 4/2019 | Greber | F16K 49/005 |
| 2021/0222775 A1 * | 7/2021 | Knepper | F16J 15/3236 |

* cited by examiner

COMPONENT ASSEMBLY FOR A MOTOR VEHICLE

This application claims priority under 35 U.S.C. § 119 to patent application no. DE 10 2020 200 555.9, filed on Jan. 17, 2020 in Germany, the disclosure of which is incorporated herein by reference in its entirety.

BACKGROUND

The disclosure relates to a component assembly for a motor vehicle.

Component assemblies for motor vehicles which have an actuator (for example a motor), a shaft, and a, for example rotatable, actuating element that is coupled to the shaft are known from the prior art. The component assembly can be, for example, a throttle flap module or a so-called general-purpose actuator. The actuating element herein can be, for example, a (throttle) flap or a roller which is mounted on a lever and actuates, for example, an air flap in the intake or exhaust duct of a motor vehicle. The actuating element and/or the actuator herein are/is often disposed in a housing. The actuating element and the actuator herein can be spatially separated from one another by a wall of the housing. The shaft herein penetrates a through opening in the wall, for example. A sealing system which is to prevent or minimize the passage of, for example, water from one side of the wall to the other side of the wall can be provided in the through opening.

Such a component assembly is known from DE 10 2018 103 720 A1.

SUMMARY

The disclosure proceeds from the concept that component assemblies of this type can be heavily exposed to liquid and/or gaseous media, for example. Under moist or wet road conditions, for example, the component assemblies can be exposed to permanent spraying by contaminated water which splashes from the tires up to the component assembly, for example. This requires a high complexity in terms of ensuring the tightness of the component assembly.

Component assemblies of this type can furthermore be used in the proximity of hot surfaces. Great temperature changes, for example in the range from −40° C. to 170° C., can arise here. These temperature changes set further high requirements in terms of the sealing by way of which the shaft in the through opening is to be sealed. It has been demonstrated that it can be difficult to ensure the tightness in the entire temperature range by virtue of the expansion of the material.

At the same time, severely heavier corrosion can arise specifically at the high temperatures of, for example, 160° C. or even 170° C., above all when the fluid media are saline, for example, or when aggressive oils or vapors are contained in the fluid media. Furthermore, not all materials are suitable for sealing the sealing point across the desired temperature range without leakages and brittleness or a change in the elastic properties.

Finally, it is necessary for a long operating life to be achieved such that the sealing point is to display ideally little wear even in the case of a multiplicity of movements of the shaft during the service life. It is moreover desirable for as little friction as possible to be generated at the sealing point so as not to have to unnecessarily oversize the actuator.

Furthermore, a bearing which in an exemplary manner can be provided in the through opening and permits the shaft to rotate with low friction is to be protected as far as possible against particles and dirt. In order for a complex and separate encapsulation of such a bearing to be able to be avoided it is necessary for the seal to ideally also repel or bind (filter) particles that are transported by the fluid media.

There is therefore a potential demand in terms of providing a component assembly for a motor vehicle, the component assembly having a sealing system for a shaft guided through a through opening of a housing, wherein the sealing system reliably and permanently prevents or minimizes, respectively, the migration of fluid media from the one side of the through opening to the other side of the through opening over large temperature ranges and maximum temperatures of, for example, 165° C. or even 170° C., wherein the sealing system in terms of construction is furthermore to be as small as possible so as to be able to provide, for example, a bearing which has comparatively long bearing means (for example rolling elements, for example needles) and is able to be attached in the through opening, or so as to be able to reduce the wall thickness in the region of the through opening, the sealing system in the case of wear on the sealing means of the sealing system furthermore ensuring the sealing function in an ideally automatic (self-adjusting) manner in the case of wear on the sealing means of the sealing system and in a movement (rotation) of the shaft generating as little friction as possible.

This demand can be met by the subject matter of the present disclosure as described below. Advantageous embodiments of the present disclosure are also described below.

Proposed according to a first aspect of the disclosure is a component assembly for a motor vehicle. The component assembly has a housing, furthermore an actuating element that is rotatable about an axis, furthermore an actuator which is specified for causing a rotation of the actuating element, and a rotatable shaft which extends along a shaft axis and is disposed between the actuating element and the actuator and which is coupled to the actuating element and the actuator. The shaft is guided through a first through opening in the housing, wherein a sealing system is provided in a radial direction perpendicular to the shaft axis so as to be between the shaft and a first internal wall of the first through opening. The sealing system has a sealing element support having a first side and a second side that faces away from the first side, wherein the sealing element support is fastened in the first through opening, wherein the sealing element support has a second through opening having a second internal wall. The shaft is guided through the second through opening, wherein a first sealing element is fastened in a locationally fixed manner to the sealing element support on and/or at the first side of the sealing element support, wherein the first sealing element has a third through opening through which the shaft is guided. The first sealing element by way of a third internal wall of the third through opening bears in an encircling manner on the shaft. The first sealing element is designed from felt.

It is advantageously caused on account thereof that the first sealing element causes sealing in relation to fluid media in terms of the latter passing through the first through opening, on the one hand. The first sealing element designed from felt can furthermore advantageously receive particles and thus filter the particles from the liquid media, or bind the particles, respectively. The first sealing element can advantageously ensure the sealing between the first internal wall and the shaft even under variable moisture conditions and across a large temperature range. Friction between the first sealing element and the shaft is furthermore advantageously very low. Finally, the elastic felt material can correct the sealing action in a self-adjusting manner in the case of wear on the first sealing element in the region of the third through opening such that a long operating life associated with reliable sealing is caused. Finally, a particularly stable sealing system of small construction (for example above all along the axial direction) can advantageously be provided on account of the constructive design comprising the sealing element support and the first sealing element.

Unless otherwise described, in the context of this application the term "having" is used synonymously with the term "comprising".

The radial direction is perpendicular to the direction of the axis, or the shaft axis, respectively. An encircling direction encircles the direction of the axis, or the shaft axis, respectively.

The component assembly can be specified for use in a motor vehicle.

The shaft can be fastened indirectly, for example, or directly to the actuating element. The shaft can be connected indirectly, for example, or directly to the actuator.

The actuator can be, for example, a motor, for example an electric motor, for example a brushless DC motor.

On account of the sealing element support being press-fitted into the first through opening, there is the advantageous effect that the assembling of the sealing element support and/or of the sealing system is possible in a particularly simple and cost-effective manner. The sealing support can thus be fastened or fixed, respectively, in a force-fitting or friction-fitting manner in the first through opening. The fastening can be caused in the axial direction and/or in the radial direction and/or in the encircling direction.

The sealing element support, for example in the non-assembled state thereof in the first through opening, can have a certain oversize in relation to a diameter of the first through opening, A force-fitting or friction-fitting, respectively, connection between the sealing element support and the first through opening is then caused during the press-fitting.

On account of the sealing element support on the radial external side thereof having a collar which protrudes beyond a support plane on which the first sealing element is disposed, there is the advantageous effect that the first sealing element can be placed in the first through opening so as to be positionally secured in the radial direction. The first sealing element on the external wall thereof can bear on an internal side of the collar, for example. In this way, the first sealing element can also be pre-loaded in the direction toward the shaft such that the sealing effect is ensured. In this way, the pre-loading of the first sealing element is furthermore advantageously also independent of potential tolerances of the diameter of the first through opening. For example, when the sealing element support is press-fitted in the first through opening, or connected in a materially integral manner therein, any leakage path along the first internal wall of the first through opening is prevented.

Radial positioning of the first sealing element in relation to the first and the second through opening is ensured in a particularly reliable manner in this way. On account thereof, it can be caused that the first, the second and the third through openings are disposed so as to be substantially concentric with one another, for example.

It can be provided, for example, that the collar has a height above the support plane that is at least 30% of a thickness of the first sealing element, preferably at least 50% of the thickness of the first sealing element, and particularly preferably at least 75% of the thickness of the first sealing element. Radial positioning of the first sealing element in relation to the first and the second through opening is ensured in a particularly reliable manner in this way.

Particularly reliable and secure sealing is caused on account of the first sealing element being compressed between the collar and the shaft (for example at room temperature). Moreover, the first sealing element can thus correct itself in a self-adjusting radially inward manner in the case of wear on the first sealing element due to the rotation of the shaft, on account of which the service life of the seal is advantageously increased. It is finally caused that the sealing effect is reliable and secure at any temperature in the operating temperature range (for example −40° C. to 170° C.), because the first sealing element is pre-loaded and remains firmly pressed against the shaft in the case of variable expansion rates.

On account of a second sealing element being provided on the second side of the sealing element support in the first through opening, wherein the second sealing element bears in an encircling manner on the shaft, the sealing effect is advantageously further improved. The second sealing element herein can furthermore advantageously be specially adapted to sealing in relation to the ingress of fluid media (for example liquids or gases), since the passage of particles through the first sealing element is to be reduced or precluded. It is advantageously provided that the second sealing element, in terms of a direction viewed from a more contaminated side that is exposed to the media, is disposed behind the first sealing element (in a manner analogous to that of a fine filter which in a liquids filter is disposed behind a coarse filter).

Particularly positive sealing is advantageously caused on account of the second sealing element having an elastic seal lip. The seal lip advantageously bears in an encircling manner on the shaft.

Alternatively or additionally it is provided that the second sealing element largely (to the extent of more than 50%) comprises PTFE or fluorocarbon (FKM). The second sealing element can be made of PTFE or FKM, for example, or be composed thereof. A particularly positive temperature resistance is caused on account thereof, for example in terms of the reversible elasticity which causes the sealing effect and in terms of wear. A particularly high level of resistance in terms of decomposition by aggressive media is also advantageously caused on account thereof. Finally, particularly low friction is advantageously caused on account thereof.

When PTFE is used, the PTFE may be virgin or compound PTFE.

Particularly reliable assembling, a particularly positive sealing effect, and reliable axial positioning in the first through opening is advantageously caused on account of the second sealing element being designed in the form of a doughnut which bears in particular at least partially on a shoulder of the first through opening.

It is advantageously provided that the second sealing element has an annular outer portion and an annular inner portion, wherein the second sealing element by way of the inner portion bears on the shaft, wherein the inner portion in relation to the outer portion is angled in the direction of the first sealing element. A certain level of pre-loading of the second sealing element in relation to the shaft can be ensured on account thereof, for example. Should wear arise over time on the inner portion that bears on the shaft, the sealing effect can be maintained in a self-adjusting manner in that the second portion slips downward along the shaft. The service life of the sealing system is advantageously increased on account thereof.

In one refinement it is provided that the second sealing element is fastened to the second side of the sealing element support.

On account thereof, the sealing system can be installed as a modular unit in a particularly simple manner, and the risk of any leakage on account of faulty assembling is minimized.

The fastening can be non-releasable, for example, such that it is impossible for the second sealing element to be released in a non-destructive manner from the sealing element support.

Alternatively, it can be provided that the second sealing element is an element which is separate from the sealing element support. In this way, the sealing element support having the first sealing element can be provided as a first unit, and the second sealing element can be provided as a second unit. After assembling the shaft in the first through opening (by pushing the shaft through the latter), the second sealing element can thus advantageously be pushed over the shaft and self-centering can be caused in this way. It is thus ensured that the second sealing element overall bears in a uniformly encircling manner on the shaft. The sealing element support and the first sealing element are then assembled only thereafter.

Depending on the specific application (for example different operating temperatures, different requirements in terms of tightness), different combinations of the first and the second sealing element can furthermore advantageously be provided in this way in a targeted manner, or the second sealing element can in principle also be omitted, respectively. For example, the second sealing element in terms of the material thereof or in terms of the thickness thereof along the axial direction can be specially optimized and separately provided for the respective specific application.

One refinement provides that the second internal wall of the second through opening of the sealing element support is spaced apart in an encircling manner from the shaft, wherein the second sealing element by way of the inner portion thereof protrudes into the space which in the radial direction extends between the second through opening and the shaft.

A particularly compact and small construction mode of the sealing system along the axial direction is advantageously enabled on account thereof. On account thereof, for example a bearing having longer support elements (for example needles) can be used with an identical axial length of the first through opening, for example when using a bearing for the shaft, this improving the load rating or the load bearing capability, respectively.

A particularly positive sealing effect of the second sealing element can advantageously be caused on account of the second sealing element on the side thereof that faces the sealing element support being coated or wetted with an elastomer. A secondary seeping path for media can be effectively precluded by the elastomer. This is because media which penetrate the first sealing element reach the side of the second sealing element that faces the first sealing element. If the media were now able to move along this surface in a radially outward manner and then flow around the second sealing element, the media would be able to externally bypass the second sealing element. The coating or wetting, respectively, by way of the elastomer effectively seals off this secondary seeping path. To this end, the elastomer merely for further improving the sealing effect, for example, can also be compressed in the axial direction, or firmly pressed onto the second sealing element, respectively, by the sealing element support.

When the sealing element support is pressed along the axial direction against the second sealing element, the elastomer disposed between the second sealing element and the sealing element support can furthermore advantageously and be displaced in the radial direction. The second sealing element connected to the elastomer follows this movement and in this way is automatically also pushed radially inward in the direction of the shaft and thus (further) pre-loaded. The sealing effect is further improved on account thereof.

The material of the elastomer can be different from the material of the second sealing element, for example. The elastomer can have or comprise, respectively, or largely (to the extent of more than 50%) comprise, merely natural rubber, rubber, ethylene-propylene-diene-monomer rubber (EPDM) or silicone, or be composed of one of these materials. It is understood that other materials can also be selected for the elastomer, depending on the application conditions.

On account of the sealing element support being designed from the same material as the housing in the region of the first through opening it is advantageously prevented that leakage paths arise between the housing and the sealing element support as a consequence of dissimilar coefficients of expansion in the event of temperature changes.

For example, the housing can be designed from a metal (for example aluminum or steel) or from a plastics material (for example polyamide).

It is advantageously provided that the first through opening is disposed in a cover of the housing. The sealing system can thus be assembled in a particularly simple manner. The collateral costs are particularly minor in the case of an assembly error. Moreover, in the case of a deteriorating sealing effect the low-cost cover of the housing can be readily replaced conjointly with the sealing system.

In one refinement it is provided that a bearing which mounts the shaft is disposed in a portion that faces the second side of the sealing element support in the first through opening. On account thereof, the shaft can advantageously be moved in a particularly low-friction manner in the first through opening.

The bearing can be a rolling bearing, a needle bearing, a ball bearing, or a friction bearing, for example.

BRIEF DESCRIPTION OF THE DRAWINGS

Further features and advantages of the present disclosure will become obvious to the person skilled in the art from the description hereunder of exemplary embodiments with reference to the appended drawings, which exemplary embodiments are however not to be interpreted as limiting the concepts described herein. In the drawings.

DETAILED DESCRIPTION

Figure 1:
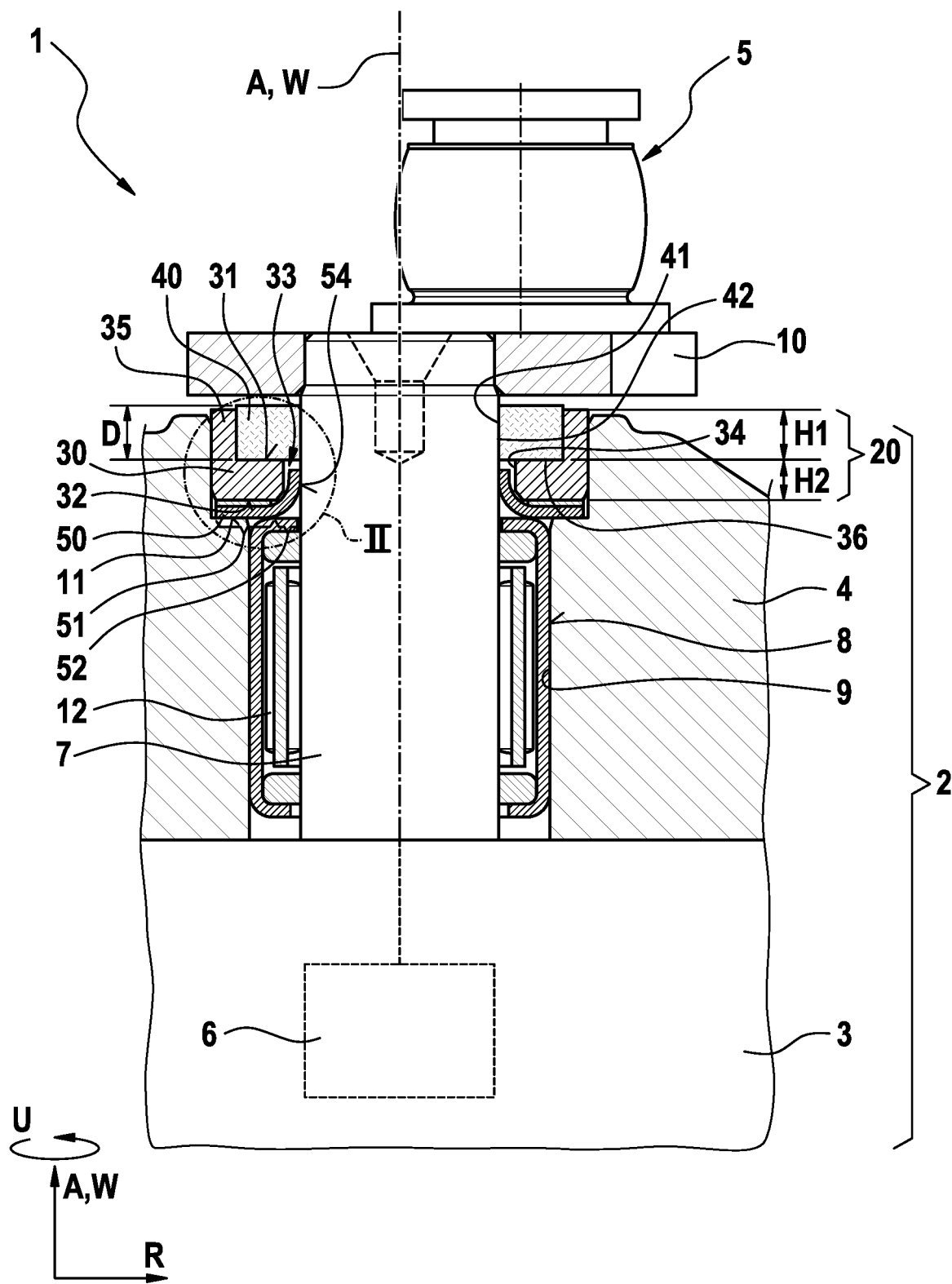
FIG. 1 shows a schematic cross section through a component assembly.

FIG. 1 shows a schematic cross section through a component assembly 1. This component assembly 1 can be a throttle flap system or a general-purpose actuator, for example.

The component assembly 1 may be suitable for installation in a motor vehicle. The component assembly 1 can however also be specified for use or installation, respectively, in a motor vehicle.

The component assembly has a housing 2 (in part schematically illustrated in the form of a block) which here has a housing cup 3 and a cover 4. The component assembly 1 furthermore has an actuating element 5 that is rotatable about an axis A, furthermore an actuator 6 (illustrated merely as a block) which is specified for causing a rotation of the actuating element 5, and a rotatable shaft 7 which extends along a shaft axis W and is disposed between the actuating element 5 and the actuator 6 and which is coupled to the actuating element 5 and the actuator 6.

The shaft 7 is guided through a first through opening 8 in the housing 2, wherein a sealing system 20 is provided in a radial direction R perpendicular to the shaft axis W so as to be between the shaft 7 and a first internal wall 9 of the first through opening 8.

The sealing system 20 has a sealing element support 30 having a first side 31 and a second side 32 that faces away from the first side 31, wherein the sealing element support 30 is fastened in the first through opening 8.

The sealing element support 30 has a second through opening 33 having a second internal wall 34, wherein the shaft 7 is guided through the second through opening 33. A first sealing element 40 is fastened in a locationally fixed manner to the sealing element support 30 on or at, respectively, the first side 31 of the sealing element support 30. The first sealing element 40 has a third through opening 41 through which the shaft 7 is guided.

The first sealing element 40 by way of a third internal wall 42 of the third through opening 41 bears in an encircling manner on the shaft 7, and the first sealing element 40 is designed from felt. The felt can be produced from natural fibers or from plastics-material fibers. The felt is particularly advantageously resistant to temperatures in the range from −40° C. to 160° C., or even −50° C. to 170° C.

The sealing element support 30 here, in a merely exemplary manner, is press-fitted into the first through opening 8. The sealing element support 30 therein is held in a force-fitting or friction-fitting manner, for example. The sealing element support 30 can also be fastened in a materially integral manner, for example be adhesively bonded or welded. Other fastening possibilities are however also conceivable; the sealing element support 30 can also be screw-fitted, for example.

The sealing element support 30 on the radial external side thereof in an exemplary manner here has a collar 35 which protrudes beyond a support plane 36 on which the first sealing element 40 is disposed. The collar 35 here has a height H1 above the support plane 36 which is at least 80% of a thickness D of the first sealing element 40. The first sealing element 40 is radially particularly positively guided or positioned, respectively, on account thereof. The thickness D can be at least 1 mm, preferably at least 3 mm, for example.

The support plane 36 per se has a support plane height H2. The support plane height H2 can be at least 0.5 mm, preferably at least 1 mm, for example.

The first sealing element 40 here is compressed between the collar 35 and the shaft 7.

In this exemplary embodiment a second sealing element 50 is provided on the second side 32 of the sealing element support 30 in the first through opening 8. Here, the second sealing element 50 bears in an encircling manner on the shaft 7.

The second sealing element 50 an elastic seal lip. This seal lip is at most 1 mm thick when viewed along the axial direction, for example. On account thereof, the seal lip is particularly flexible.

The second sealing element 50 here, in a merely exemplary manner, is made largely, to an extent of more than 50%, of PTFE or fluorocarbon (FKM). On account thereof, the second sealing element is particularly stable in relation to high and low temperatures and in relation to chemical changes on account of aggressive media. However, the use of other materials is also possible, depending on the intended use and the application conditions.

The second sealing element 50 here is designed in the form of a doughnut. The doughnut bears at least partially on a shoulder 11 of the first through opening 8. The doughnut in this portion, when viewed along the axial direction, is disposed between the sealing element support 30 and the shoulder 11. The second sealing element 50 a fourth through opening 54 through which the shaft 7 protrudes in the assembled state.

The second sealing element 50 here, in a merely exemplary manner, has an annular outer portion 51 and an annular inner portion 52. The second sealing element 50 by way of the inner portion 52 bears on the shaft 7. The inner portion 52 here, in a merely exemplary manner, in relation to the outer portion 51 is angled in the direction of the first sealing element 40.

In the embodiment illustrated here, the second sealing element 50 is an element which is separate from the sealing element support 30 and able to be tailored to the respective specific application. The second sealing element 50 bears in an encircling manner on the shaft 7 and at the radially outer periphery of the second sealing element 50 does not abut the first internal wall 9 of the first through opening 8. Rather, a void 55 is situated there (see FIG. 2). In this way, the second sealing element 50 is self-centering when assembled on the shaft. An external diameter of the second sealing element 50 in this exemplary embodiment is thus smaller than an internal diameter of the first through opening in that portion where the second sealing element 50 is assembled.

Alternatively, the second sealing element 50 in an embodiment not illustrated here can be fastened to the second side 32 of the sealing element support 30. For example, a non-releasable fastening, for example by adhesive bonding or welding, can be present here. The sealing element support 30 conjointly with the two sealing elements 40, 50 can thus be made and installed as a modular unit.

The second internal wall 34 of the second through opening 33 of the sealing element support 30 is spaced apart in an encircling manner from the shaft 7 by a spacing B. The spacing B can be 0.05 mm to 2 mm, for example, preferably 0.1 mm to 1 mm.

The second sealing element 50 by way of the inner portion 52 thereof protrudes into the space which in the radial direction R extends between the second through opening 33 and the shaft 7. For example, the inner portion can protrude into the space by at least 0.5 mm, preferably at least 1 mm. On account thereof, a sealing system 20 which is of a particularly compact and small construction in the axial direction is achieved.

In this exemplary embodiment the sealing element support 30 is designed from the same material as the housing 2 in the region of the first through opening 8. The first through opening 8 here is disposed in the cover 4.

However, it is also possible for different materials to be used. In this instance, the coefficients of thermal expansion of the two materials are advantageously very similar across the range of the operating temperatures so as to minimize thermal stresses and leakage paths.

A bearing 12 which mounts the shaft 7 is furthermore disposed in a portion that faces the second side 32 of the sealing element support 30 in the first through opening 8. The bearing 12 can be configured as a rolling bearing, a needle bearing, a ball bearing, or a friction bearing, for example.

The component assembly can be assembled in the following steps, for example (method for producing a component assembly): first, the housing 2 (here: the cover 4 of the housing 2) having a first through opening 8, as well as the shaft 7, the sealing element support 30, the first sealing element 40 and the second sealing element 50 are provided (the sealing element support 30 and the second sealing element 50 here are mutually separate elements merely in an exemplary manner). A bearing 12 is furthermore optionally provided. Furthermore, the actuator 6 (for example an electric motor) and the actuating element 5 can be provided.

If a bearing 12 has been provided, the bearing 12 in a first step is assembled, for example press-fitted, in the first through opening 8. In a further step, the shaft 7 is guided through the first through opening 8. In a further step, the second sealing element 50 is assembled in that the latter by way of the fourth through opening 54 thereof is push-fitted over the shaft 7, for example. In a further step, the sealing element support 30 conjointly with the first sealing element 40 preassembled thereon, for example, is assembled in, for example press-fitted into, the through opening 8. The sealing element support herein can be press-fitted onto the second sealing element 50 in the axial direction. Finally, the actuator 6 and the actuating element 5 can be coupled to the shaft 7.

Figure 2:
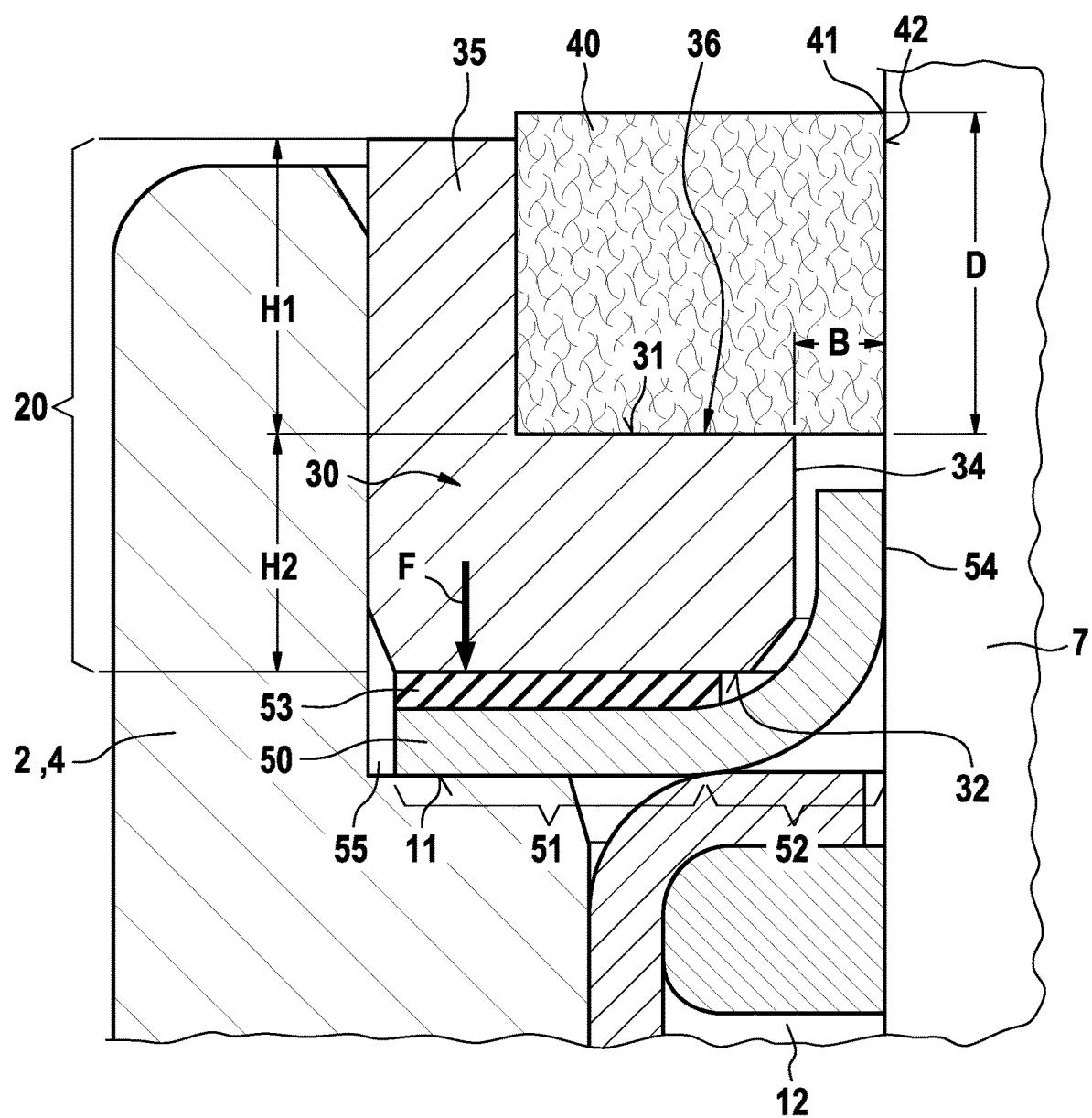
FIG. 2 shows an enlarged fragment of the sealing system from FIG. 1.

FIG. 2 shows an enlarged fragment of the sealing system from FIG. 1.

It can be readily seen in FIG. 2 that the second sealing element 50 on the side thereof that faces the sealing element support 30 is coated or wetted with an elastomer 53. The elastomer 53 can comprise, or largely (to the extent of more than 50%) comprise, for example, natural rubber, rubber, ethylene-propylene-diene-monomer rubber (EPDM) or silicone, or be composed of one of these materials. However, other materials for the elastomer 53 are also conceivable.

The elastomer 53 helps in sealing off a secondary path for fluid media. For example, this secondary path can run between the sealing support 30 and the second sealing element, around the second sealing element 50, and then downward through the first through opening 8 in the figure.

The sealing effect in relation to this secondary path is further increased when the sealing element support in the figure is pressed with a force F from above along the axial direction onto the second sealing element 50 (see the downward-pointing arrow). The elastomer 53 is in this instance compressed and seals off a secondary path in a particularly effective manner.

The material of the elastomer 53 here is different from the material of the second sealing element 50.

The elastomer 53 here is non-releasably connected to the second sealing element 50.

It can be readily seen that, when viewed in the radial direction R, the void 55 is situated between the first internal wall 9 and an outer periphery of the second sealing element 50. The sealing element support 30 in the region of the support plane 36, at least on the second side 32, by way of the spacing B is furthermore spaced apart from the shaft 7.

Figure 3:
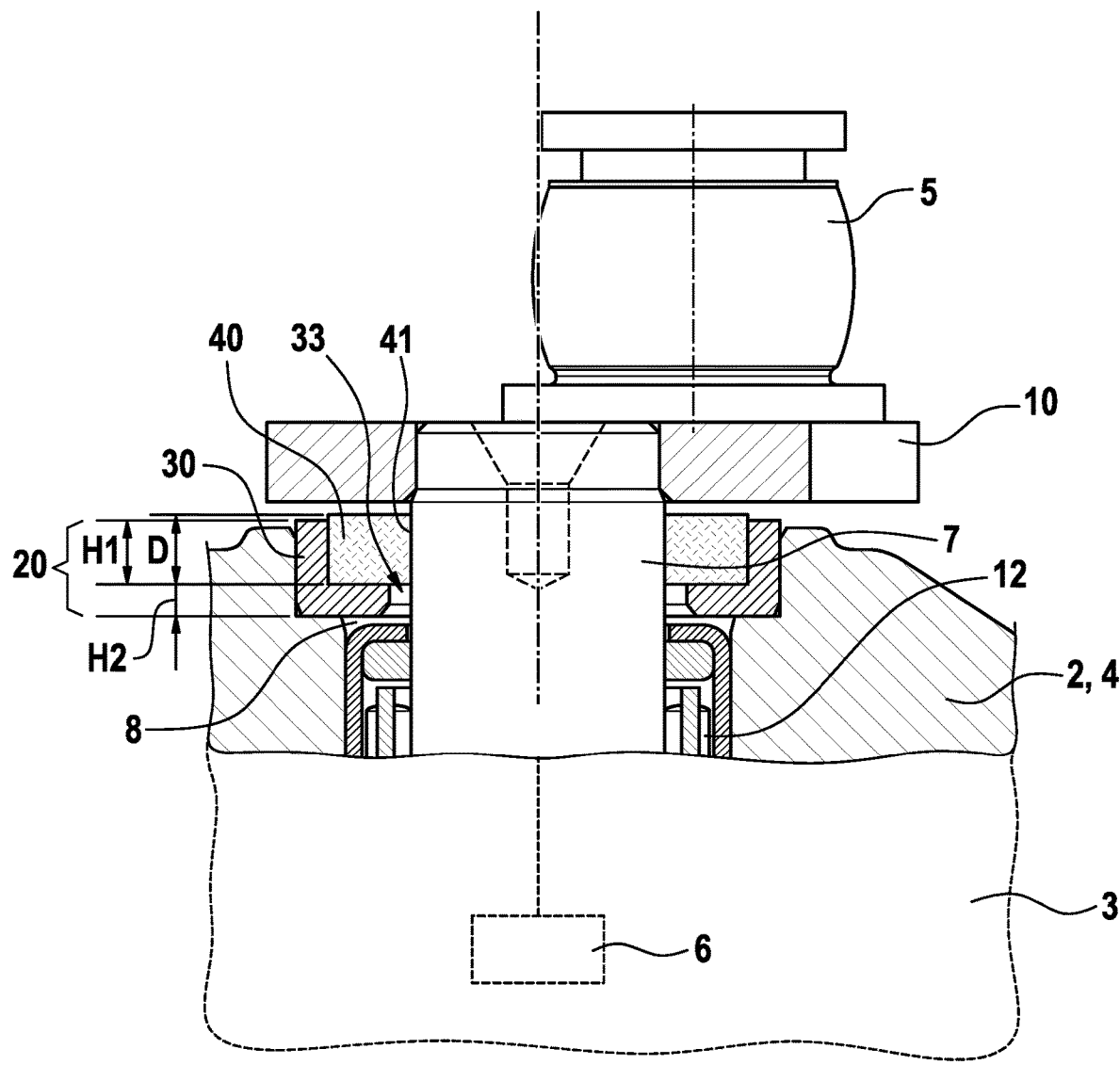
FIG. 3 shows a schematic cross section through a further design embodiment of a component assembly.

FIG. 3 shows a schematic cross section through a further embodiment of a component assembly.

The embodiment of FIG. 3 here differs from that from FIG. 1 only in that the second sealing element 50 is dispensed with.

Correspondingly, all steps which relate to the second sealing element 50 are absent in the method for producing this component assembly.

The component assembly can be, for example, an electric general-purpose actuator or a throttle flap or an exhaust-gas return valve or a wastegate for a turbocharger, without being limited to these embodiments.

What is claimed is:

1. A component assembly for a motor vehicle, comprising:
   a housing having a first internal wall defining a first through opening;
   an actuating element that is rotatable about an axis;
   an actuator which is configured to cause rotation of the actuating element;
   a rotatable shaft which extends along a shaft axis and is disposed between the actuating element and the actuator and which is coupled to the actuating element and the actuator, the shaft also extending through the first through opening; and
   a sealing system arranged between the shaft and the first internal wall in a radial direction that is perpendicular to the shaft axis, the sealing system comprising:
      a first sealing element; and
      a sealing element support having a first axial side and a second axial side that faces away from the first side, the sealing element support being fastened in the first through opening and having a second internal wall defining a second through opening,
   wherein the shaft extends through the second through opening,
   wherein the first sealing element is fixedly fastened to the first axial side of the sealing element support,
   wherein the first sealing element has a third internal wall that defines a third through opening through which the shaft extends, the third internal wall bearing in an encircling manner on the shaft, and
   wherein the first sealing element is made from felt.

2. The component assembly according to claim 1, wherein the sealing element support is press-fitted into the first through opening.

3. The component assembly according to claim 1, wherein:
   a radially external side of the sealing element support has a collar which protrudes axially beyond a support plane on which the first sealing element is supported by the sealing element support, and
   the collar has a height above the support plane that is at least 30% of a thickness of the first sealing element along the shaft axis.

4. The component assembly according to claim 3, wherein the first sealing element is compressed between the collar and the shaft.

5. The component assembly according to claim 1, further comprising:
   a second sealing element arranged on the second axial side of the sealing element support in the first through opening, and
   the second sealing element bears in an encircling manner on the shaft.

6. The component assembly according to claim 5, wherein:
   the second sealing element has an elastic seal lip,
   the second sealing element comprises PTFE or fluorocarbon, and the second sealing element is designed in the form of a doughnut which bears at least partially on a shoulder of the first through opening.

7. The component assembly according to claim 5, wherein:
the second sealing element has an annular outer portion and an annular inner portion,
the inner portion bears on the shaft, and
the inner portion is angled from the outer portion in a direction toward the first sealing element.

8. The component assembly according to claim 5, wherein the second sealing element is non-releasably fastened to the second side of the sealing element support.

9. The component assembly according to claim 1, wherein the actuating element is a motor, an electric motor, or a brushless DC motor.

10. A component assembly for a motor vehicle, comprising:
a housing;
an actuating element that is rotatable about an axis;
an actuator which is configured to cause rotation of the actuating element;
a rotatable shaft which extends along a shaft axis and is disposed between the actuating element and the actuator and which is coupled to the actuating element and the actuator, the shaft also extending through a first through opening in the housing;
a sealing system arranged in a radial direction that is perpendicular to the shaft axis so as to be located between the shaft and a first internal wall of the first through opening; and
a first sealing element,
wherein the sealing system has a sealing element support having a first side and a second side that faces away from the first side,
wherein the sealing element support is fastened in the first through opening,
wherein the sealing element support has a second through opening having a second internal wall,
wherein the shaft extends through the second through opening,
wherein the first sealing element is fastened in a fixed manner in relation to the sealing element support on the first side of the sealing element support,
wherein the first sealing element has a third through opening through which the shaft extends,
wherein the first sealing element by way of a third internal wall of the third through opening bears in an encircling manner on the shaft,
wherein the first sealing element is made from felt,
wherein a second sealing element is provided on the second side of the sealing element support in the first through opening,
wherein the second sealing element bears in an encircling manner on the shaft, and
wherein the second sealing element is non-releasably fastened to the second side of the sealing element support.

11. The component assembly according to claim 7, wherein:
the second internal wall of the second through opening of the sealing element support is spaced apart in an encircling manner from the shaft, and
the inner portion of the second sealing element protrudes into a space defined in the radial direction between the second internal wall and the shaft.

12. The component assembly according to claim 5, wherein:
the second sealing element, on a side facing the sealing element support, is coated or wetted with an elastomer, and
the elastomer is made of an elastomer material that is different from a second sealing element material from which the second sealing element is made.

13. The component assembly according to claim 1, wherein the sealing element support is made from the same material as the housing in the region of the first through opening.

14. The component assembly according to claim 1, wherein the first through opening is disposed in a cover of the housing.

15. The component assembly according to claim 1, further comprising a bearing configured to mount the shaft, wherein:
the bearing is disposed in a portion of the first through opening toward which the second axial side of the sealing element support faces, and
the bearing is a rolling bearing, a needle bearing, a ball bearing, or a friction bearing.

16. The component assembly according claim 5, wherein the second sealing element is an element which is separate from the sealing element support.

17. The component assembly according to claim 5, wherein the second sealing element has an elastic seal lip.

18. The component assembly according to claim 5, wherein the second sealing element largely comprises PTFE or fluorocarbon.

19. The component assembly according to claim 5, wherein the second sealing element is configured in the form of a doughnut which bears at least partially on a shoulder of the first through opening.

20. The component assembly according to claim 10, wherein the actuating element is a motor, an electric motor, or a brushless DC motor.

* * * * *